US012573747B2

(12) United States Patent
Okuda et al.

(10) Patent No.: US 12,573,747 B2
(45) Date of Patent: Mar. 10, 2026

(54) SUBSTRATE FOR HIGH FREQUENCY DEVICE

(71) Applicant: AGC Inc., Tokyo (JP)

(72) Inventors: Ryota Okuda, Tokyo (JP); Toshifumi Kakiuchi, Tokyo (JP)

(73) Assignee: AGC Inc., Tokyo (JP)

( * ) Notice: Subject to any disclaimer, the term of this patent is extended or adjusted under 35 U.S.C. 154(b) by 137 days.

(21) Appl. No.: 18/519,152

(22) Filed: Nov. 27, 2023

(65) Prior Publication Data

US 2024/0088549 A1 Mar. 14, 2024

Related U.S. Application Data

(63) Continuation of application No. PCT/JP2022/021930, filed on May 30, 2022.

(30) Foreign Application Priority Data

Jun. 8, 2021 (JP) ................................ 2021-095543

(51) Int. Cl.
*H01Q 1/36* (2006.01)
*H01Q 23/00* (2006.01)

(52) U.S. Cl.
CPC ............... *H01Q 1/36* (2013.01); *H01Q 23/00* (2013.01)

(58) Field of Classification Search
CPC . H01Q 1/36; H01Q 1/38; H01Q 23/00; B32B 2457/202
See application file for complete search history.

(56) References Cited

U.S. PATENT DOCUMENTS

| | | | | |
|---|---|---|---|---|
| 2012/0250146 | A1* | 10/2012 | Tamai | B32B 17/10201 359/361 |
| 2017/0010399 | A1* | 1/2017 | Yasui | G02F 1/133528 |
| 2017/0059913 | A1* | 3/2017 | Ku | G02F 1/13338 |
| 2017/0095999 | A1* | 4/2017 | Kaneiwa | B32B 27/36 |
| 2018/0086955 | A1* | 3/2018 | Fujita | C09J 133/10 |
| 2019/0237875 | A1 | 8/2019 | Yamagishi et al. | |
| 2020/0239738 | A1 | 7/2020 | Naito et al. | |
| 2021/0066790 | A1 | 3/2021 | Park et al. | |
| 2021/0234268 | A1* | 7/2021 | Liu | H01P 1/184 |
| 2023/0176426 | A1* | 6/2023 | Kakuta | G02F 1/1334 349/16 |

FOREIGN PATENT DOCUMENTS

| | | | |
|---|---|---|---|
| JP | 2020-29399 | A | 2/2020 |

* cited by examiner

*Primary Examiner* — Hai V Tran
(74) *Attorney, Agent, or Firm* — Oblon, McClelland, Maier & Neustadt, L.L.P.

(57) ABSTRACT

To provide a substrate for a high frequency device, which satisfies requirements of low dielectric loss tangent, adhesion and transparency.
A substrate for a high frequency device comprising a transparent glass substrate 16 and a transparent resin base material 20 bonded to the glass substrate 16 via an optical clear adhesive 18, wherein the dielectric loss tangent of the resin base material 20 in dielectric loss tangent measurement test is 0.01 or less, the peel strength in peel test is 3.0 Worn or more, and the amount of out gas in out gas test is 5.0 μg/g or less.

8 Claims, 2 Drawing Sheets

SUBSTRATE FOR HIGH FREQUENCY DEVICE

TECHNICAL FIELD

The present invention relates to a substrate for a high frequency device.

BACKGROUND ART

For communication devices such as smartphones and personal digital assistants, and electronic devices such as surface acoustic wave (SA) devices and antenna components, for the purpose of e.g. an increase of the communication capacity and an increase of the communication speed, an increase of the signal frequency is in progress. For a substrate used for an electronic device for such high frequency application (hereinafter sometimes referred to as "high frequency device"), conventionally, an insulating substrate such as a resin substrate, a ceramic substrate or a glass substrate has been used. It is important for an insulating substrate to be used for a high frequency device to have a property to maintain a low dielectric loss tangent even in a high frequency region, in other words, a property to reduce the dielectric loss.

In recent years, as an antenna component applicable to a high frequency region called millimeter waves or terahertz (THz) waves, a liquid crystal antenna having high birefringence even in a high frequency region attracts attention.

Patent Document 1 discloses a glass substrate used for a high frequency device applicable to high frequency signals of 10 GHz or more.

PRIOR ART DOCUMENTS

Patent Documents

Patent Document 1: JP-A-2020-29399

DISCLOSURE OF INVENTION

Technical Problem

A substrate for a high frequency device may be used, for example, as having a base material having an electric circuit of copper wire mounted thereon bonded in some cases. Such a base material is required to have the same low dielectric loss tangent property as the substrate, and to have adhesion to the substrate also. Further, it is sometimes required to have durability to maintain the performance of the high frequency device over a long period of time.

However, a conventional substrate for a high frequency device (including a base material) is insufficient in the low dielectric loss tangent property, adhesion and durability.

Under these circumstances, the object of the present invention is to provide a substrate for a high frequency device having improved low dielectric loss tangent property, adhesion and durability.

Solution to Problem

To achieve the object of the present invention, the substrate for a high frequency device of the present invention is a substrate for a high frequency device comprising a transparent glass substrate, and a transparent resin base material bonded to the glass substrate via an optical clear adhesive, wherein the peel strength in peel test of the substrate for a high frequency device is 3.0 N/cm or more, the dielectric loss tangent of the resin base material in dielectric loss tangent measurement test is 0.01 or less, and the amount of out gas from the resin base material in out gas test is 5.0 μg/g or less.

According to an embodiment of the present invention, the resin base material is preferably such that the dielectric loss tangent in dielectric loss tangent measurement test is 0.007 or less.

According to an embodiment of the present invention, the resin base material is preferably such that the peel strength from the glass substrate in peel test is 4.0 N/cm or more.

According to an embodiment of the present invention, the resin base material is preferably such that the amount of out gas in out gas test is 3.5 μg/g or less.

According to an embodiment of the present invention, the resin base material is preferably formed of a cycloolefin polymer resin.

According to an embodiment of the present invention, the resin base material is preferably formed of a polyethylene terephthalate resin.

According to an embodiment of the present invention, the resin base material is preferably formed of a fluororesin, a polyimide resin, a modified polyimide resin, a polyethylene naphthalate or a polyether ether ketone resin.

Advantageous Effects of Invention

According to the present invention, low dielectric loss tangent property, strength and durability improve.

DESCRIPTION OF EMBODIMENTS

Now, the substrate for a high frequency device according to the present invention will be described with reference to drawings. In this specification, "high frequency" means a high frequency of for example 3.5 GHz or more, preferably 28 GHz or more, more preferably 35 GHz or more.

Figure 1:
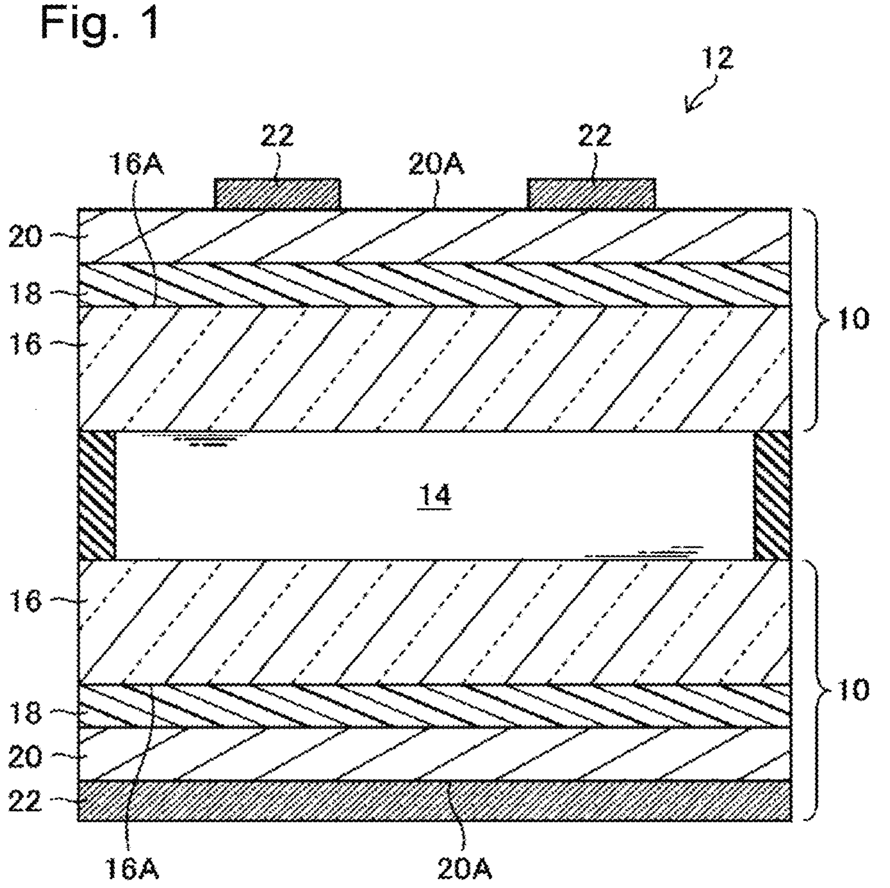
FIG. 1 is a cross sectional view illustrating a liquid crystal antenna to which a substrate for a high frequency device according to an embodiment is applied.

FIG. 1 is a cross sectional view illustrating an example of a liquid crystal antenna 12 to which the substrate 10 for a high frequency device according to an embodiment of the present invention (hereinafter sometimes referred to simply as "substrate for a device") is applied. The liquid crystal antenna 12 shown in FIG. 1 is constituted by a liquid crystal (LC) layer 14 sealed with two substrates 10, 10 for a device, Now, the substrate 10 for a device as a constituent of the liquid crystal antenna 12 will be described. The substrate 10 for a device is an example of the substrate for a high frequency device of the present invention, and the liquid crystal antenna 12 is an example of a high frequency device. Further, in FIG. 1, dimensions and scales of the members constituting the substrate 10 for a device are different from actual ones, and the members are schematically shown for easy understanding.

<Substrate 10 for a Device>

The substrate 10 for a device has an insulating glass substrate 16, and a resin base material 20 bonded to a principal surface 16A of the glass substrate 16 via an optical clear adhesive (OCA) 18. On the principal surface 20A of the resin base material 20, a wiring layer 22 is formed. The glass substrate 16 is an example of the glass substrate of the present invention, and the resin base material 20 is an example of the resin base material of the present invention. Further, the OCA 18 is an example of the optical clear adhesive of the present invention.

Since the substrate 10 for a device is used as a high frequency device, it preferably has a property such that the dielectric loss tangent (tan δ) at 28 GHz is 0.01 or less, particularly 0.007 or less. The dielectric loss tangent may be calculated as a total of values of the respective constitutes by their volume ratios. Further, as a high frequency device, the substrate 10 for a device preferably has durability such that no bubbling occurs at the time of heat treatment such as reflow.

The substrate 10 for a device is provided both on the top and the bottom surface sides of the liquid crystal layer 14, and the two glass substrates may have the same material, thickness, and the like, so long as performance as the liquid crystal antenna is exhibited, or their materials, thicknesses, and the like, may be different from each other. Further, the substrate 10 for a device only on the top surface side may be sufficient in some cases (for example, a case where a conductor pattern is formed on the liquid crystal layer side of the glass substrate 16).

The visible light transmittance of the substrate 10 for a device is, in order that the function as a liquid crystal is fulfilled, preferably 50% or more, particularly preferably 70% or more.

<Optical Clear Adhesive (OCA) 18>

The OCA 18 may, for example, be an acrylic pressure-sensitive adhesive, a urethane pressure-sensitive adhesive, a rubber pressure-sensitive adhesive or a silicone pressure-sensitive adhesive. The OCA 18 is also preferred to have a low dielectric loss tangent, for use as a high frequency device. The thickness of the OCA 18 is preferably from 10 to 50 μm, particularly preferably from 15 to 35 μm, in view of adhesion and durability.

Low dielectric loss tangent and adhesion of the material of the OCA 18 are in a trade-off relationship in many cases, from its nature. In the present invention, the material is preferred for the substrate 10 for a device since it can satisfy both low dielectric loss tangent and adhesion.

In an application in which the liquid crystal layer 14 is exposed to external light, to protect the liquid crystal, the transmittance of the OCA 18 at 380 nm is preferably 5% or less, particularly the transmittance at 400 nm is preferably 5% or less.

<Wiring Layer 22>

The wiring layer 22 is a layer formed of a conductor, and its thickness is usually preferably from 0.1 to 50 μm, particularly preferably about 1 to 10 μm. The conductor forming the wiring layer 22 is not particularly limited and may, for example, be a metal such as copper, gold, silver, aluminum, titanium, chromium, molybdenum, tungsten, platinum or nickel or an ahoy or a metal compound containing at least one of such metals, or the like. The structure of the wiring layer 22 is not limited to a monolayer structure, and may be a multilayer structure such as a laminated structure of a titanium layer and a copper layer.

On the wiring layer 22, another layer may be provided. For example, another resin base material or another wiring layer, another OCA layer, or the like, may be provided depending upon the applications.

The method for forming the wiring layer 22 is not particularly limited, and for example, a known conventional method such as printing method using a conductor paste, dipping method, plating method, deposition method or sputtering method may be employed.

<Glass Substrate 16>

The glass substrate 16 preferably has a dielectric loss tangent (tan δ) at 28 GHz of 0.01 or less, particularly 0.007 or less. By the glass substrate 16 having a dielectric loss tangent at 28 GHz of 0.01 or less, particularly 0.007 or less, the dielectric loss in a high frequency region exceeding 30 GHz can be reduced. The dielectric loss tangent of the glass substrate 16 at 28 GHz is preferably 0.005 or less, more preferably 0.003 or less.

The dielectric constant of at 28 GHz is preferably 10 or less. By the glass substrate 16 having a dielectric constant at 28 GHz of 10 or less also, the dielectric loss in a high frequency region can be reduced. The dielectric constant of the glass substrate 16 is more preferably 7 or less, further preferably 6 or less, particularly preferably 5 or less.

By using such a glass substrate 16, the transmission loss at 28 GHz can be reduced, specifically, reduced to 1 dB/cm or less. Thus, properties such as the quality and the intensity of high frequency signals, particularly high frequency signals exceeding 30 GHz, further high frequency signals of 28 GHz or more, are maintained, and a high frequency device to which such high frequency signals are suitably applied can be provided.

The glass substrate 16 is a glass substrate formed of a network-forming material containing $SiO_2$ as the main component, which preferably satisfies both the following requirements (1) and (2), both the following requirements (1) and (3), or all of the following requirements (1), (2) and (3). The glass substrate 16 is formed by melting and curing the material composition. The method of forming the glass substrate 16 is not particularly limited and e.g. a method may be employed in which a conventional molten glass is formed into a predetermined plate thickness by float process, and after annealing, the glass is cut into a desired shape to obtain a plate glass.

In this specification, glass means a solid which is amorphous and undergoes glass transition from its definition, Crystallized glass which is a mixture of glass and a crystallized product, and a glass sintered body containing a crystalline filler, are preferably not included. Whether the glass is entirely amorphous, may be confirmed by no definite diffraction peak being confirmed by X-ray diffraction measurement.

Further, in this specification, "containing $SiO_2$ as the main component" means that the content of $SiO_2$ is highest among the proportions of the components by mol % based on oxides. In the following description, "to" used to show the range of the numerical values is used to include the numerical values before and after it as the lower limit value and the upper limit value. Unless otherwise specified, the proportions of the respective components in the glass substrate 16 are mol percentage (mol %) based on oxides.

Requirement (1): the glass substrate 16 contains alkali metal oxides in a total content within a range of from 0.001 to 5% and has a molar ratio of $Na_2O/(Na_2O+K_2O)$ among the alkali metal oxides within a range of from 0.01 to 0.99.

Requirement (2): the glass substrate 16 contains $Al_2O_3$ and $B_2O$ in a total content within a range of from 1 to 40% and has a molar ratio of $Al_2O_3/(Al_2O_3+B_2O_3)$ within a range of from 0 to 0.45.

Requirement (3): the glass substrate 16 contains alkaline earth metal oxides in a total content within a range of from 0.1 to 13%.

Regarding the requirement (1), by the content of the alkali metal oxides of the glass substrate 16 containing $SiO_2$ as the main component being 5% or less, low dielectric loss property of the glass substrate 16 is increased. Further, by the content of the alkali metal oxides being 0.001% or more, no excessive purification of the material will be required, and practical glass melting property and productivity of the glass substrate 16 will be obtained, and in addition, the coefficient of thermal expansion of the glass substrate 16 will be adjusted. The alkali metal oxides contained in the glass substrate 16 may be $Li_2O$, $Na_2O$, $K_2O$, $Rb_2O$ and $Cs_2O$, and particularly $Na_2O$ and $K_2O$ are important and thus the total content of $Na_2O$ and $K_2O$ is preferably within a range of from 0.001 to 5%. The content of the alkali metal oxides is preferably 3% or less, more preferably 1% or less, further preferably 0.2% or less, particularly preferably 0.1% or less, still more preferably 0.05% or less. The content of the alkali metal oxides is more preferably 0.002% or more, further preferably 0.003% or more, particularly preferably 0.005% or more.

Further, by coexistence of $Na_2O$ and $K_2O$ in a glassy substance containing $SiO_2$ as the main component, in other words by adjusting the molar ratio of $Na_2O/(Na_2O+K_2O)$ to be within a range of from 0.01 to 0.99, movement of alkali components is suppressed, whereby low dielectric loss property of the glass substrate 16 is increased. The molar ratio of $Na_2O/(Na_2O+K_2O)$ is more preferably 0.98 or less, further preferably 0.95 or less, particularly preferably 0.9 or less. The molar ratio of $Na_2O/(Na_2O+K_2O)$ is more preferably 0.02 or more, further preferably 0.05 or more, particularly preferably 0.1 or more.

According to the above-constituted glass substrate 16, the dielectric loss can be decreased for example in a region exceeding 30 GHz, as compared with a conventional alkali-free glass substrate. Further, when the liquid crystal antenna 12 is constituted, the difference in the coefficient of thermal expansion with other components will not be significant, whereby a practical liquid crystal antenna 12 can be provided, as compared with a conventional quartz glass substrate. The thickness of the glass substrate 16 is preferably from 0.5 to 2 mm, particularly preferably from 0.5 to 1.5 mm in view of strength and durability.

The glass substrate 16 is provided both on the top and the bottom surface sides of the liquid crystal layer 14, and the two glass substrates may have the same material, thickness, and the like, so long as performance as the liquid crystal antenna is exhibited, or their materials, thicknesses, and the like, may be different from each other.

By the way, the substrate 10 for a device applied to a high frequency device such as the liquid crystal antenna 12 preferably has low dielectric loss tangent property, high adhesion and high durability. The substrate 10 for a device according to the present embodiment has the glass substrate 16 and the resin base material 20 bonded to the glass substrate 16 via the OCA 18. The glass substrate 16 and the optical clear adhesive 18 have been described above, and now, the resin base material 20 suitable for the substrate 10 for a device will be described with reference to several examples.

<Resin Base Material 20>

The resin base material 20 preferably has insulating property. As a preferred example of the resin base material 20, a cycloolefin polymer (COP) resin may be mentioned. The COP resin is one type of optical plastic and has properties such as high transparency, high heat resistance and low birefringence, as compared with transparent plastics such as a polycarbonate and polymethyl methacrylate. By such properties, the COP resin is suitable for a light guide plate (base material) applicable to a substrate for a device. The thickness of the resin base material 20 is preferably from 50 to 200 μm, particularly preferably from 70 to 150 μm, in view of durability.

The resin base material 20 preferably contains an alicyclic structure-containing polymer. The alicyclic structure-containing polymer is a polymer having an alicyclic structure in its molecule, and means a polymer or a hydrogenated product thereof, obtainable by polymerization using a cyclic olefin as a monomer. The alicyclic structure-containing polymer may be used alone or in combination of two or more in an optional ratio.

The alicyclic structure in the alicyclic structure-containing polymer may, for example, be a cycloalkane structure or a cycloalkene structure. Among them, a cycloalkane structure is preferred, with which an optical film excellent in properties such as thermal stability will readily be obtained. The number of carbon atoms in one alicyclic structure is preferably 4 or more, more preferably 5 or more, and preferably 30 or less, more preferably 20 or less, particularly preferably 15 or less. When the number of carbon atoms in one alicyclic structure is within the above range, mechanical strength, heat resistance and forming property will be highly balanced. The resin base material 20 preferably contains the alicyclic structure-containing polymer in an amount of 90 wt % or more.

The alicyclic structure-containing polymer may, for example, be the following polymers (α) to (δ).

polymer (α): ring-opening polymer of cyclic olefin monomer
polymer (β): hydrogenated product of polymer (α)
polymer (γ): addition polymer of cyclic olefin monomer
polymer (δ): hydrogenated product of polymer (γ)

The alicyclic structure-containing polymer is preferably a ring-opening polymer of dicyclopentadiene or a hydrogenated product of the ring-opening polymer of dicyclopentadiene, or a hydrogenated product of the ring-opening polymer of dicyclopentadiene. The ring-opening polymer of dicyclopentadiene means a polymer having a proportion of structural units derived from dicyclopentadiene to all structural units of usually 50 wt % or more, preferably 70 wt % or more, more preferably 90 wt % or more, particularly preferably 100 wt %.

The resin base material 20 is suitably used as a substrate for device by subjecting the alicyclic structure-containing polymer to annealing. The annealing is preferably a treatment at 120° C. under −0.1 MPa for 12 hours or more.

The resin base material 20 is, in FIG. 1, provided both on the top surface side (wiring side) and the bottom surface side of the liquid crystal layer 14, and the two resin base materials may have the same material, thickness, and the like, so long as performance as the liquid crystal antenna is exhibited, or their materials, thicknesses, and the like, may be different from each other. Further, the resin base material 20 only on the top surface side (wiring side) of the liquid crystal layer may be sufficient in some cases.

Further, on the surface of the resin base material 20, a SiNx film may be formed by sputtering, whereby the resin base material 20 can be used suitably as a member of the substrate 10 for a device. The sputtered film has a film thickness of preferably 30 nm or more and 500 nm or less. As the sputtered film, in addition to the SiNx film, an oxide film or an oxynitride film may also be suitably used.

<Low Dielectric Loss Tangent Property of Resin Base Material 20>

With respect to the dielectric loss tangent of the resin base material 20, in order to cope with an increase of the signal frequency of a high frequency device, the dielectric loss tangent in dielectric loss tangent test is preferably 0.01 or less, more preferably 0,007 or less, further preferably 0.001 or less. In this viewpoint, the dielectric loss tangent of the resin base material 20 formed of the COP resin is more preferably 0,0003 or less. Accordingly, by employing the COP resin as the resin base material 20, the low dielectric loss tangent property will improve, and a substrate 10 for a device capable of coping with an increase of the signal frequency can be provided. The dielectric loss tangent in this example means a value measured by using a split post dielectric resonator and a vector network analyzer. The measurement frequency is 10 GHz which is the resonance frequency of air of the cavity resonator (dielectric loss tangent measurement test).

<Adhesion of Resin Base Material 20 (Substrate 10 for a Device)>

With respect to the adhesion of the resin base material 20 to the glass substrate 16 via the OCA 18, in order to increase reliability of the substrate 10 for a device, the peel strength of the resin base material 20 from the glass substrate 16 is preferably 3.0 N/cm or more, more preferably 4.0 N/cm or more; further preferably 5.0 N/cm or more. According to the above-described Examples, in this viewpoint, the peel strength of the substrate 10 for a device having the resin base material 20 formed of the COP resin was 4.7 N/cm. Accordingly, by employing the COP resin for the resin base material 20, the adhesion will improve, and a highly reliable substrate 10 for a device can be provided. The peel strength (load) means a value when the resin base material 20 is peeled from the glass substrate 16, by a 90° peel test of pressure-sensitive adhesive tapes in accordance with JIS Z0237:2009, at a rate of pulling of 50 mm/min (peel test).

<Durability of Resin Base Material 20>

With respect to durability of the resin base material 20 (favorable appearance, homogeneity of dielectric performance in the resin base material), in order to increase reliability of the substrate 10 for a device, in other words, in order that bubbles included between the glass substrate 16 and the resin base material 20 do not influence the dielectric performance of the high frequency device, the amount of out gas released from the resin base material 20 is preferably 5.0 µg/g or less, more preferably 4.0 µg/g or less, further preferably 3.0 µg/g or less. In a case where the amount of out gas is too large, the dielectric property at the bubble portion is dominated by the dielectric property of the bubbles themselves, and thus by the presence of bubbles, there may be a difference between the design value and the measured value of the device. According to the after-described Examples, in this viewpoint, the amount of out gas from the resin base material 20 formed of the COP resin was 3.5 µg/g. Thus, by employing the COP resin for the resin base material 20, the durability improves, and a highly reliable substrate 10 for a device having a change of the dielectric property by the out gas suppressed, can be provided. The amount of out gas means an amount of gas discharged from the resin base material when heated at 120° C. for 10 minutes using a gas chromatograph mass spectrometer (GC/MS-QP2020NXCI/AOC-6000 (manufactured by Shimadzu Corporation)) (out gas test).

"The amount of out gas" was measured by the following measurement method. That is, by headspace gas chromatography/mass spectroscopy (HS-GC/MS), about 40 mg of a sample was put and sealed in a glass vial and heated in an air atmosphere at 120° C. for 10 minutes, and 20 µl of a gaseous phase in the vial was automatically injected into the GC/MS spectrometer. The amount of out gas derived from the sample was calculated based on the peak area ratio of a methyl ethyl ketone (MEK) standard sample measured under the same conditions. For measurement, headspace sampler (HS-20), gas chromatograph (GC2030) and mass spectrometer (GC/MS-QP2020NX) manufactured by Shimadzu Corporation were used.

The above "amount of out gas" is obtained by separating and quantifying the out gas by gas chromatography/mass spectroscopy and in particular, the total amount of components (the unreacted monomer, the oligomer, the remaining solvent, etc.) separated and detected from the out gas until a retention time of 25 minutes by a gas chromatograph, quantified by a mass spectrometer.

The measurement conditions of the gas chromatography are as follows.

(1) Column: DB-1 (manufactured by Agilent)

(2) Column length: 30 m (3) Column temperature: initial temperature of 40° C. for 5 minutes, and then 15 heated to 300° C. at a temperature-raising rate of 10° C./min (4) Carrier gas: helium (5) Carrier gas flow rate: 1.0 ml/min As a measurement apparatus, for example, "HS-20" manufactured by Shimadzu Corporation may be used as a headspace sampler, "GC2030" manufactured by Shimadzu Corporation may be used as a gas chromatograph, and "GC/MS-QP2020NX" manufactured by Shimadzu Corporation may be used as a mass spectrometer. One example of the method for measuring the amount of out gas was described above.

<Visible light transmittance of resin base material 20>

The visible light transmittance of the resin base material 20 is preferably from 50 to 90%, whereby the performance as a liquid crystal device can be exhibited.

According to the substrate 10 for a device having the resin base material 20 formed of the COP resin, having the above properties, the dielectric loss tangent of the resin base material 20 in the dielectric loss tangent measurement test is 0.01 or less, the peel strength in the peel test of the substrate 10 for a device is 3.0 N/cm or more, and the amount of out gas of the resin base material 20 in the out gas test is 5.0 µg/g or less, and thus low dielectric loss tangent property, strength and durability improve.

Further, in the present invention, the dielectric loss tangent of the resin base material 20 in the dielectric loss tangent measurement test is preferably 0.007 or less. Further, in the present invention, the peel strength in the peel test of the substrate for a device is preferably 4.0 N/cm or more. Further, the amount of out gas from the resin base material 20 in the out gas test is preferably 3.5 µg/g or less. According to the substrate 10 for a device having the resin base material 20 formed of the COP resin, which satisfies all of these requirements, dielectric loss tangent property, strength and durability further improve.

By the way, the resin base material 20 is not limited to one formed of the COP resin, and one formed of the following resin, having the same properties as the COP resin, may be employed for the resin base material 20, so long as the performance as a device substrate is achieved.

As the material of the resin base material 20, a polyethylene terephthalate (PET) resin (product number: A4360, A4160) may be applicable to the resin base material 20. Further, a fluororesin (PFA, ETFE, PTFE), a polyimide (PI)

resin, a modified polyimide (MPI) resin, a polyethylene naphthalate (PEN) resin and a polyether ether ketone (PEEK) resin may be applicable.

On the other hand, PFA (a fluororesin) useful as a material of the low dielectric loss tangent has low peel strength and is thereby unsuitable for a device substrate.

Now, low dielectric loss tangent property, adhesion and durability in cases where the respective resins are employed for the resin base material 20 will be described. The test methods and the measurement methods of the dielectric loss tangent, the peel strength and the amount of out gas are the same as the test methods and the measurement methods in the case of the resin base material 20 formed of the COP resin.

The dielectric loss tangent of the resin base material 20 formed of the PET resin is preferably 0.01, particularly 0.007 or less. Accordingly, by employing the PET resin for the resin base material 20, low dielectric loss tangent property improves, and the substrate 10 for a device capable of coping with an increase of the signal frequency can be provided. Further, the dielectric loss tangent of the resin base material 20 formed of the fluororesin is preferably 0.0009 or less. Accordingly, by employing the fluororesin for the resin base material 20, low dielectric loss tangent property will improve, and a substrate 10 for a device capable of coping with an increase of the signal frequency can be provided. Further, the dielectric loss tangent of the resin base material 20 formed of a polyimide resin, a modified polyimide resin, a polyethylene naphthalate resin or a polyether ether ketone resin is also preferably 0.01 or less.

The peel strength in the peel test of the substrate 10 for a device having the resin base material 20 formed of the PET resin is preferably 4.0 N/cm or more. Accordingly, by employing the PET resin for the resin base material 20, adhesion will improves, and a highly reliable substrate 10 for a device can be provided. Further, the substrate 10 for a device having the resin base material 20 formed of the fluororesin is preferably such that the adhesion surface of the fluororesin is subjected to plasma treatment to improve the adhesion to the glass substrate 16, whereby a peel strength of 3.0 N/cm or more is obtained. Accordingly, by employing the fluororesin for the resin base material 20, adhesion will improve, and a highly reliable substrate 10 for a device can be provided. Further, in the substrate 10 for a device having the resin base material 20 formed of a polyimide resin, a modified polyimide resin, a polyethylene naphthalate resin or a polyether ether ketone resin also, the peel strength is preferably 3.0 N/cm or more.

The amount of out gas from the resin base material 20 is preferably 2.0 μg/g or less. Accordingly, by employing the PET resin for the resin base material 20, durability will improve, and a highly reliable resin base material 20 having a change of dielectric property by out as suppressed can be provided. Further, in the resin base material 20 formed of a fluororesin, a polyimide resin, a modified polyimide resin, a polyethylene naphthalate resin or a polyether ether ketone resin also, the amount of out gas is preferably 5.0 μg/g or less.

<Liquid Crystal Antenna 12>

The liquid crystal antenna 12 is, as shown in FIG. 1, a patch array antenna having a variable dielectric material, preferably the liquid crystal layer 14. Since the liquid crystal antenna 12 contains a continuously electrically steered material, by adjustment by a voltage applied, it can function as a two-dimensional beam-steering phased array antenna. Further, since the substrate 10 for a device and the resin base material 20 constituting the liquid crystal antenna 12 have low dielectric loss property, the loss can be minimized even in a high frequency band. By using the substrate for a device of the present invention, it is possible to prepare a thin and durable high performance liquid crystal antenna.

EXAMPLES

The present invention will be described in further detail with reference to test specimens No. 1 to 6 (hereinafter also referred to as “Ex. 1 to 6”) shown in the following Tables 1 and 2. However, it should be understood that the present invention is by no means restricted to such specific Examples. Ex. 1, 2, 3, 5 and 6 are Examples of the present invention, and Ex. 4 is a Comparative Example.

<Preparation of Test Specimen>

The substrate 10 for a device as shown in FIG. 1 was prepared. The materials used are as shown in Table 1.

As shown in Table 1, in all of Ex. 1 to 6, the OCA 18 was formed of VHBY-4905J (manufactured by 3M) and had a thickness of 25 μm.

The glass substrate 16 was formed of glass having an alkali metal oxide content of 0,001 mol % or less and had a thickness of 1 mm.

The resin base material 20 in Ex. 1 was obtained in such a manner that COP ZE16 was subjected to vacuum annealing (150° C., −0.1 MPa, 12 hours) and subjected to hot pressing (170° C., 12 MPa, 10 minutes) and formed into a sheet again. The resin base material 20 in Ex. 5 was obtained in such a manner that on COP ZF16, Ar as a commercial SISPA manufactured by Heraeus as a sputtering target was deposited by sputtering in a $N_2$ atmosphere (SiNx film was formed in 30 nm). The resin base material 20 in Ex. 2 was formed of PET-A4360, the resin base material 20 in Ex. 3 was formed of PET-A4160, and the resin base material 20 in Ex. 6 was formed of PET-A4360. The thickness of the resin base material 20 was 0.1 μm.

<Evaluation Standards>

Out gas evaluation: a case where the amount of out gas of the substrate for a device≤5.0 μg/g was satisfied, was rated as O (OK), and a case where not satisfied was rated as X (NG). In a case where the resin base material from which the amount of out gas exceeds 5.0 μg/g is used, bubbles may form at the time of heat treatment such as reflow, thus impairing the appearance, and such a substrate is not suitable as a device substrate, since it may adversely affect the dielectric performance of a high frequency device. For the test, the substrate exposed to 120° C. atmosphere for 1 hour was used.

Peel evaluation: a case where the peel strength≥3.0 (N/cm) was satisfied was rated as O (OK), and a case where not satisfied was rated as X (NG).

Low dielectric loss tangent property evaluation: a case where the dielectric loss tangent of the resin base material 20 (28 GHz) in the dielectric loss tangent measurement test was 0.001 or less was rated as ◎ (OK), and a case where it was 0.01 or less was rated as O (OK), and a case where it exceeded 0.01 was rated as X (NG).

The dielectric loss tangent of the substrate for a device in Ex. 1 to 6 was 0.01 or less (a total of values of constituents by their volume ratios), and the visible light transmittance was 80%.

The results are shown in Table 2.

TABLE 1

| Test specimen No. | Dielectric loss tangent of glass substrate 16 | OCA 18 | Resin base material 20 | Dielectric loss tangent of resin base material 20 |
|---|---|---|---|---|
| 1 | 0.0025 | VHB-Y-4905J | COP ZF16 treated product | 0.0003 |
| 2 | 0.0025 | VHB-Y-4905J | PET-A4360 | 0.0070 |
| 3 | 0.0025 | VHB-Y-4905J | PET-A4160 | 0.0070 |
| 4 | 0.0025 | VHB-Y-4905J | COP ZF16 | 0.0003 |
| 5 | 0.0025 | VHB-Y-4905J | CPO ZF16 sputtered product | 0.0003 |
| 6 | 0.0025 | VHB-Y-4905J | PET-A4360 | 0.0009 |

TABLE 2

| Test specimen No. | Peel stregth (N/cm) | Peel evaluation | Amount of out gas (μg/g) | Out gas evaluation | Low dielectric loss tangent property |
|---|---|---|---|---|---|
| 1 | 4.6 | ○ | 3.4 | ○ | ◎ |
| 2 | 4.0 | ○ | 2.0 | ○ | ○ |
| 3 | 4.3 | ○ | 2.0 | ○ | ○ |
| 4 | 4.7 | ○ | 8.1 | X | ◎ |
| 5 | 4.0 | ○ | No bubbling | ○ | ◎ |
| 6 | 4.0 | ○ | 2.0 | ○ | ○ |

Figure 2A:
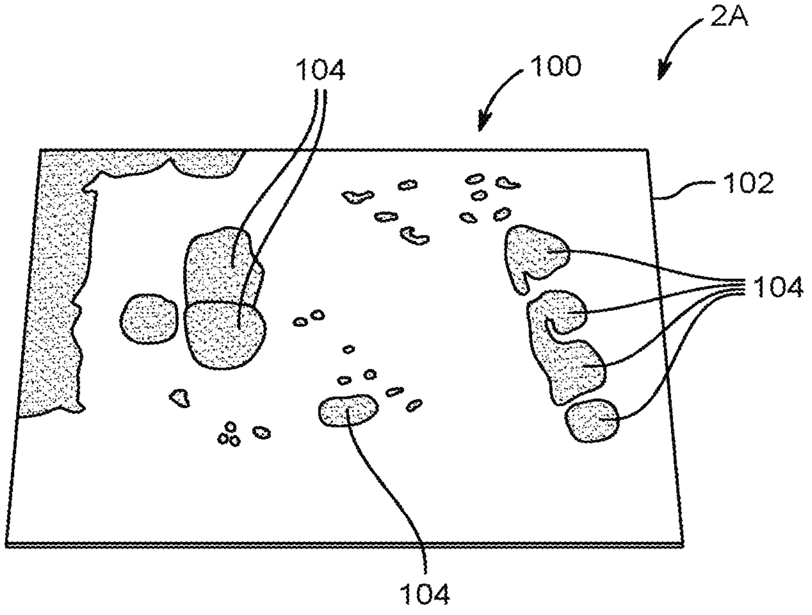
FIG. 2A is an image (photograph) illustrating experiment results indicating the relation between the amount of out gas and generation of bubbles.
Figure 2B:
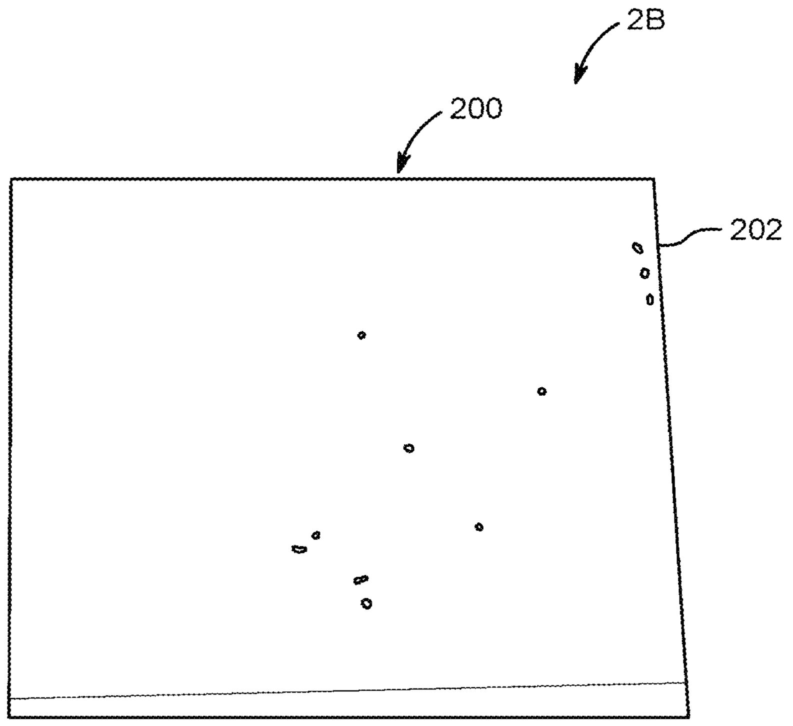
FIG. 2B is an image (photograph) illustrating experiment results indicating the relation between the amount of out gas and generation of bubbles.

FIGS. 2A and 2B are images (photographs) illustrating experiment results indicating the relation between the amount of out gas and generation of bubbles. FIG. 2A illustrate a substrate 100 for a device having a resin base material 102, and FIG. 2B illustrates a substrate 200 for a device having a resin base material 202.

Further, FIG. 2A illustrate the results in Ex. 4 (test specimen No. 4), and FIG. 2B illustrates the results in Ex. 1 (test specimen No. 1).

As shown in FIG. 2A, in Ex. 4, the amount of out gas was 8.1 μg/g, and thus a large number of bubbles 104 were confirmed, and the sizes of the bubbles were large. Whereas in Ex. 1, as shown in FIG. 2B, the amount of out gas was 3.4 μg/g, and bubbles 204 were present in dots and the sizes of the bubbles 204 were much smaller than the sizes of the bubbles 104, and thus, the performance as a liquid crystal antenna can be fulfilled.

In Ex. 4, though the requirements regarding the dielectric loss tangent and the peel strength were satisfied, the amount of out gas from the resin base material 102 in the out gas test exceeded 5.0 μg/g. As a result, the dielectric performance of a high frequency device may sometimes be affected. Thus, durability required for a high frequency device is not satisfied.

Whereas in Ex. 1, the requirements regarding the dielectric loss tangent and the peel strength were satisfied, and further, the amount of out gas was 5.0 μg/g or less (3.4 μg/g), which is within a range where the performance of a liquid crystal antenna is satisfied, and thus, durability required for a high frequency device is satisfied.

Further, not limited to the above Ex. 1 to 6, in a case where the dielectric loss tangent of the resin base material in the dielectric loss tangent measurement test exceeds 0.01, low dielectric loss tangent property required for a high frequency device is not satisfied. Further, in a case where in a case where the peel strength in the peel test of the substrate for a device is less than 3.0 N/cm, high adhesion of the resin base material from the glass substrate required for a high frequency device is not satisfied. Further, in a case where the amount of out gas from the resin base material in the out gas test exceeds 5.0 μg/g, high durability required for a high frequency device is not satisfied.

Accordingly, by adjusting the dielectric loss tangent of the resin base material 20 in the dielectric loss tangent measurement test to be 0.01 or less, the peel strength in the peel test of the substrate for a device to be 3.0 N/cm or more and the amount of out gas of the resin base material 20 in the out gas test to be 5.0 μg/g or less, a substrate 10 for a device, having low dielectric loss tangent property, strength and durability improved, can be provided.

Whereas as shown in FIG. 1, the surface roughness of the principal surface 20A of the resin base material 20 is preferably 1.5 nm or less as the arithmetic mean roughness Ra. By adjusting the arithmetic mean roughness Ra of the principal surface 20A to be 1.5 nm or less, even in a case where a skin effect occurs on the wiring layer 22 in a high frequency region exceeding 30 GHz, the skin resistance of the wiring layer 22 can be reduced, whereby the conductor loss reduces. The arithmetic mean roughness Ra of the principal surface 20A of the resin base material 20 is more preferably 1.0 nm or less, further preferably 0.5 nm or less. The surface roughness Ra means a value obtained in accordance with JIS B0601 (2001).

The substrate for a high frequency device of the present invention has been described with reference to an embodiment in which it is applied to a liquid crystal antenna (particularly a liquid crystal antenna considered to be optimum for satellite communication), however, the substrate for a high frequency device of the present invention is by no means restricted thereto. The substrate for a high frequency device of the present invention may be applicable, for example, to general high frequency electronic devices, such a communication devices dealing with high frequency signals of 10 GHz or more, frequency filter components such as SAW devices and FBAR (Film Bulk Acoustic Resonator), band pass filters such as waveguides, SIW (Substrate Integrate Waveguide) components and radar components. In the present invention, various changes and modifications are possible without departing from the intension and the scope of the present invention.

This application is a continuation of POT Application No. PCT/JP2022/021930, filed on May 30, 2022, which is based upon and claims the benefit of priority from Japanese Patent Application No, 2021-095543 filed on Jun. 8, 2021, The contents of those applications are incorporated herein by reference in their entireties.

REFERENCE SYMBOLS

10: substrate for a high frequency device (a substrate for a device), 12: liquid crystal antenna, 14: liquid crystal layer, 16: glass substrate, 16A: principal surface, 18: optical clear adhesive (OCA), 20: resin base material, 20A: principal surface, 22: wiring layer, 100: substrate fora device, 102: resin base material, 104: bubble, 200: substrate for a device, 202: resin base material, 204: bubble

What is claimed is:

1. A substrate for a high frequency device, comprising:

a transparent glass substrate; and a transparent resin base material bonded to the transparent glass substrate via an optical clear adhesive, wherein a peel strength in a peel test of the substrate for the high frequency device is 3.0 N/cm or more, and a dielectric loss tangent of the transparent resin base material in a dielectric loss tangent measurement test is 0.007 or less, and an amount of out gas from the transparent resin base material in an out gas test is 5.0 μg/g or less.

2. The substrate for a high frequency device according to claim 1, wherein the peel strength is 4.0 N/cm or more.

3. The substrate for a high frequency device according to claim 1, wherein the amount of out gas is 3.5 μg/g or less.

4. The substrate for a high frequency device according to claim 1, wherein the transparent resin base material is formed of a cycloolefin polymer resin.

5. The substrate for a high frequency device according to claim 1, wherein the transparent resin base material is formed of a polyethylene terephthalate resin.

6. The substrate for a high frequency device according to claim 1, wherein the transparent resin base material is formed of a fluororesin, a polyimide resin, a modified polyimide resin, a polyethylene naphthalate or a polyether ether ketone resin.

7. The substrate for a high frequency device according to claim 1, which is a substrate for a liquid crystal antenna.

8. A liquid crystal antenna, comprising:

two transparent glass substrates;

a liquid crystal layer sandwiched between the two transparent glass substrates; and a transparent resin base material bonded to at least one of the two transparent glass substrates via an optical clear adhesive, wherein a peel strength to peel the transparent resin base material from a transparent glass substrate of the two transparent glass substrates is 3.0 N/cm or more, and a dielectric loss tangent of the transparent resin base material in a dielectric loss tangent measurement test is 0.007 or less, and an amount of out gas from the transparent resin base material in an out gas test is 5.0 μg/g or less.

* * * * *